(12) United States Patent
Vigny et al.

(10) Patent No.: US 7,201,291 B2
(45) Date of Patent: Apr. 10, 2007

(54) CONTAINER FOR A FLOWABLE PRODUCT, PROCESS OF MANUFACTURE AND THE USE THEREOF

(75) Inventors: Murielle Vigny, Taunusstein-Wehen (DE); Alain Contal, Epinal (FR); Jean-Paul Cerveny, Vittel (FR); Gérard Denis, Reims (FR)

(73) Assignee: Nestle Waters Management & Technology, Issy-les-Moulineaux (FR)

( * ) Notice: Subject to any disclaimer, the term of this patent is extended or adjusted under 35 U.S.C. 154(b) by 0 days.

(21) Appl. No.: 10/820,815

(22) Filed: Apr. 9, 2004

(65) Prior Publication Data

US 2004/0222238 A1 Nov. 11, 2004

Related U.S. Application Data

(63) Continuation of application No. PCT/EP02/11411, filed on Oct. 10, 2002.

(30) Foreign Application Priority Data

Oct. 12, 2001 (FR) .................................. 01 13221

(51) Int. Cl.
*B65D 35/00* (2006.01)
(52) U.S. Cl. ...................... 222/107; 222/92; 222/107; 222/215; 222/206; 220/624; 215/381
(58) Field of Classification Search ............... 222/107, 222/215, 206, 92, 518; 220/721, 624; 215/381
See application file for complete search history.

(56) References Cited

U.S. PATENT DOCUMENTS

| 294,790 | A | * | 3/1884 | Kuehn | 222/92 |
|---|---|---|---|---|---|
| 1,504,920 | A | * | 8/1924 | Viegelmann | 222/92 |
| 1,575,567 | A | * | 3/1926 | Geake | 222/92 |
| 1,751,341 | A | * | 3/1930 | Leisse | 222/92 |
| 3,383,017 | A | * | 5/1968 | Krings | 222/93 |
| 3,878,977 | A | * | 4/1975 | Carlisle | 222/491 |
| 4,795,062 | A | * | 1/1989 | Bedwell et al. | 222/92 |
| 4,964,852 | A | * | 10/1990 | Dunning et al. | 604/75 |
| 5,188,261 | A | * | 2/1993 | Butters | 222/107 |

(Continued)

FOREIGN PATENT DOCUMENTS

DE 761 7571 11/1983

(Continued)

*Primary Examiner*—Patrick F. Brinson
(74) *Attorney, Agent, or Firm*—Bell Boyd & Lloyd LLP

(57) ABSTRACT

The present invention relates to a container for a flowable product, particularly for a beverage and, in particular, for still or sparkling mineral water. The container according to the invention includes a body having in a greater section a dimension $d_1$ and of at least one neck with an internal diameter $d_2$ which can be closed by a member for closing off and/or of distributing the flowable product from the container. The wall or walls forming the body of the container are preferably made of a flexible plastic which can deform for constant surface area, particularly under the weight of the flowable product from the container when the wall or walls encounter a point or bearing surface, so as to form, at least locally, a non-planar wall portion and wherein the ratio $d_2$ to $d_1$ is between 1:3 and 1:10.

17 Claims, 3 Drawing Sheets

U.S. PATENT DOCUMENTS

| | | | |
|---|---|---|---|
| 5,888,598 A | 3/1999 | Brewster et al. | 428/35.7 |
| 6,355,319 B1 | 3/2002 | Nakamachi et al. | 428/35.7 |
| 6,578,740 B1* | 6/2003 | Hagihara | 222/107 |
| 6,715,697 B2* | 4/2004 | Duqueroie | 239/327 |
| 2006/0086751 A1* | 4/2006 | Haunhorst | 222/92 |

FOREIGN PATENT DOCUMENTS

| | | |
|---|---|---|
| DE | 19500006 | 7/1996 |
| EP | 1 035 167 A1 | 9/2000 |
| FR | 2 801 276 | 5/2001 |
| GB | 2 357 491 | 6/2001 |
| JP | 10007121 | 1/1998 |
| JP | 2001122237 A2 | 5/2001 |

* cited by examiner

CONTAINER FOR A FLOWABLE PRODUCT, PROCESS OF MANUFACTURE AND THE USE THEREOF

CROSS-REFERENCE TO RELATED APPLICATIONS

This application is a continuation of International application PCT/EP02/11411 filed Oct. 10, 2002, the entire content of which is expressly incorporated herein by reference thereto.

BACKGROUND

The present invention relates to the field of the packaging of flowable products such as liquids or pasty products, particularly that of containers intended to contain beverages and more especially mineral water.

In the field of the packaging of potable water, it is commonplace to use semi-rigid packaging made of synthetic substances, commonly known as plastics, such as PET (polyethylene-terephthalate), PP (polypropylene), HDPE (high density polyethylene), etc. These packagings are generally made in the form of bottles the capacities of which are, at least in France, in most cases, between 25 cl to as large as 1.5 or 2 liters. Larger volumes are relatively infrequent, particularly on account of their weight.

Admittedly, bi-oriented PET containers of cylindrical shape or of rectangular cross section, the standard volume of which may be as much as 5 liters or more, are known. However, the mechanical strength of such containers is customarily low for weights of synthetic material which are proportionately higher and therefore not very economical. By way of indication, for modest mechanical properties, a 5-liter bottle requires at least 90 g of PET for the cylindrical version or at least 110 g for a standard bottle of rectangular cross section.

To improve the overall mechanical properties of such containers, particularly as far as their mechanical resistance to vertical crushing is concerned, the containers currently marketed have wall thicknesses which are significantly greater than those customarily employed and reinforcing structures (e.g., bulges, stiffening ridges, etc.) which further increase the total weight of the containers, their complexity and therefore their cost of manufacture.

In addition, these containers are not very practical to store, for example inside a refrigerator, given that their rigid geometric shape requires a bulky volume with well-defined dimensions.

Some solutions have already been suggested to provide consumers with containers having less thick walls and therefore containing less material. DE 19500006 and JP 10007121 concerns packagings allowing for the first to guarantee a complete emptying and to decrease the volume of waste and for the other to guarantee a standing position and a good compactness. In this case, it is polyethylene, which is worked by extrusion and blow-molding. In this case, the preform of the container does not allow to reach a big volume of the final container. Thus, improvements in these articles are desired.

SUMMARY OF THE INVENTION

The present invention is aimed at alleviating the disadvantages of known containers and its purpose is to supply a container for a flowable product which, for the same volume, requires less plastic than a standard container while at the same time having comparable mechanical properties, and the geometric shape of which can allow eased storage, even in tight spaces such as inside a refrigerator for example.

To this end, the subject of the present invention is a container for a flowable product, particularly for a beverage and, more particularly, for mineral water. This container comprises a body having in greater section a dimension $d_1$, at least one neck that has an internal diameter $d_2$ and a wall or walls forming the body of the container being made of a flexible plastic which can deform for constant surface area, such as, under the weight of the flowable product contained in the container. Also, when the wall or walls contact a point or bearing surface, they form, at least locally at this contact, at least one non-planar wall portion. Advantageously, the ratio of $d_2$ to $d_1$ is generally between 1:3 and 1:10.

Another embodiment relates to a combination of the container of the invention claim 1 and a flowable product of water or a liquid beverage. The flowable product preferably is carbonated water or a carbonated beverage and particularly sparkling mineral water. The container can be made in any one of a variety of different capacities, comprised between 20 cl and 20 l.

A further subject of the present invention is a method for manufacturing a body of a container according to the invention, wherein the body is obtained by stretch-blow molding of a plastic preform suited to the manufacture of the body with an area stretch ratio of between 20 and 50, preferably between 25 and 35. The body may be molded from PET (polyethylene terephthalate) or PEN (polyethylene naphthalate) at a blowing pressure of between about 8 and 13 bar.

BRIEF DESCRIPTION OF THE DRAWINGS

Other features and advantages of the invention will become apparent from the description which follows, given by way of example and with reference to the appended drawings in which.

DETAILED DESCRIPTION OF THE PREFERRED EMBODIMENTS

The container essentially consists of a body having in his greater section a dimension $d_1$ and of at least one neck with an internal diameter $d_2$ which can be closed by a means of closing off and/or of distributing the flowable product contained in the container, wherein the wall or walls forming the body of the container are made of a flexible plastic which can deform for constant surface area, particularly under the weight of the flowable product contained in the container when the wall or walls encounter a point or bearing surface, so as to form, at least locally at this contact, at least one non-planar wall portion and wherein the ratio $d_2$ on $d_1$ is comprised between 1:3 and 1:10.

In a preferred embodiment, the ratio $d_2$ on $d_1$ is comprised between 1:4 and 1:10. In a most preferred embodiment, the ratio $d_2$ on $d_1$ is comprised between 1:4.5 and 1:8.

There is no product on the market, and also in the cited documents, mentioning the above mentioned ratio. By working with a plastic material, for example with PET, by blow-molding, it is not evident to reach the above mentioned ratio, while keeping a good integrity of the container. Furthermore, when the container according to the invention is full, it is practically undistortable, contrary to a bottle manufactured with the same material. This undistortability, as well as the good mechanical behavior allows to consider a storage of these containers in bags or in carton, without wasting too much place, because of the containers can come closer to each others without too much dead volume.

Figure 1:
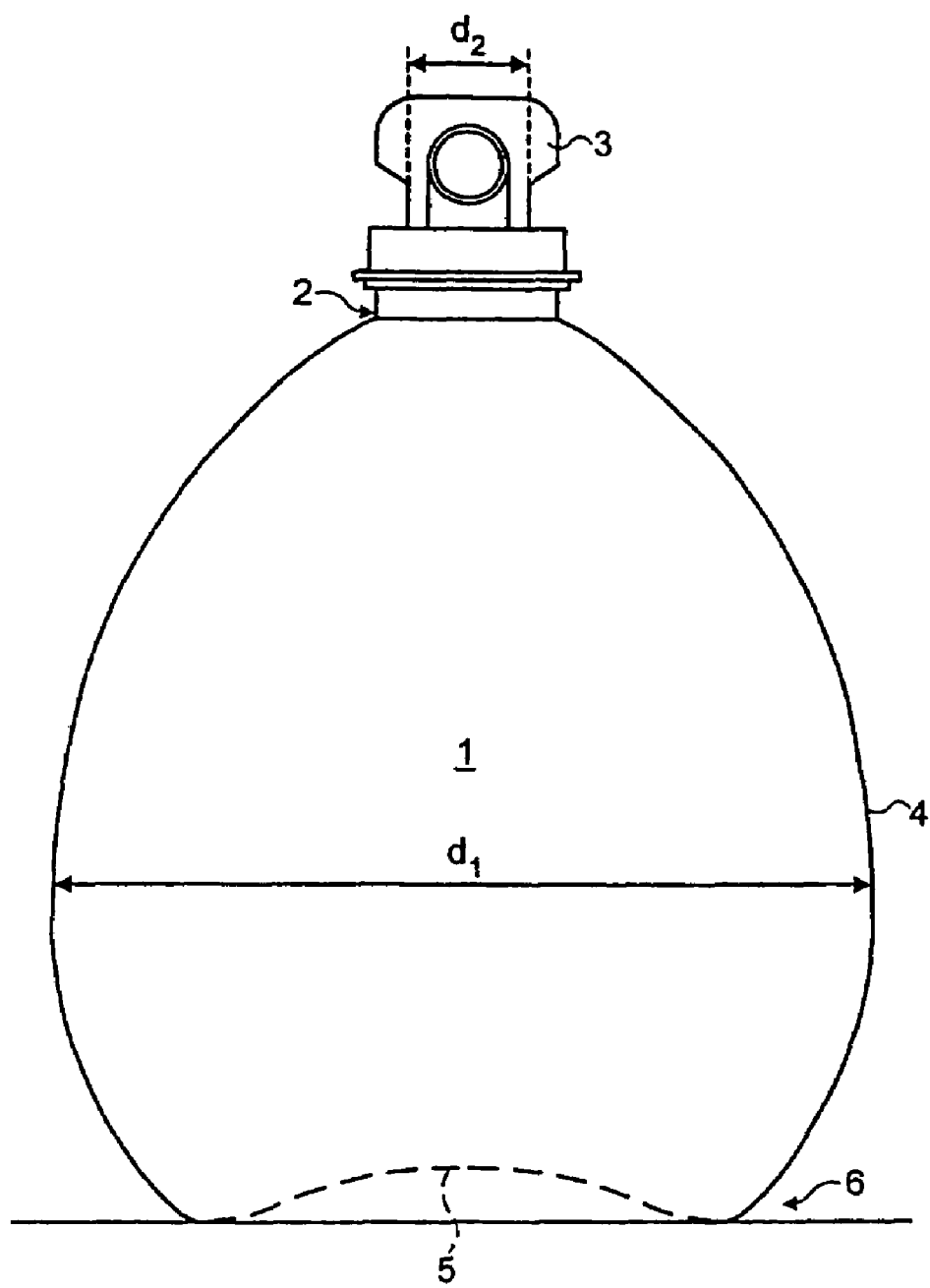
FIG. 1 is a schematic view in side elevation and in section of one embodiment of the container according to the invention.

Reference is made first of all to FIG. 1 which shows a schematic view in side elevation and in section of one embodiment of the container according to the invention.

Figure 2:
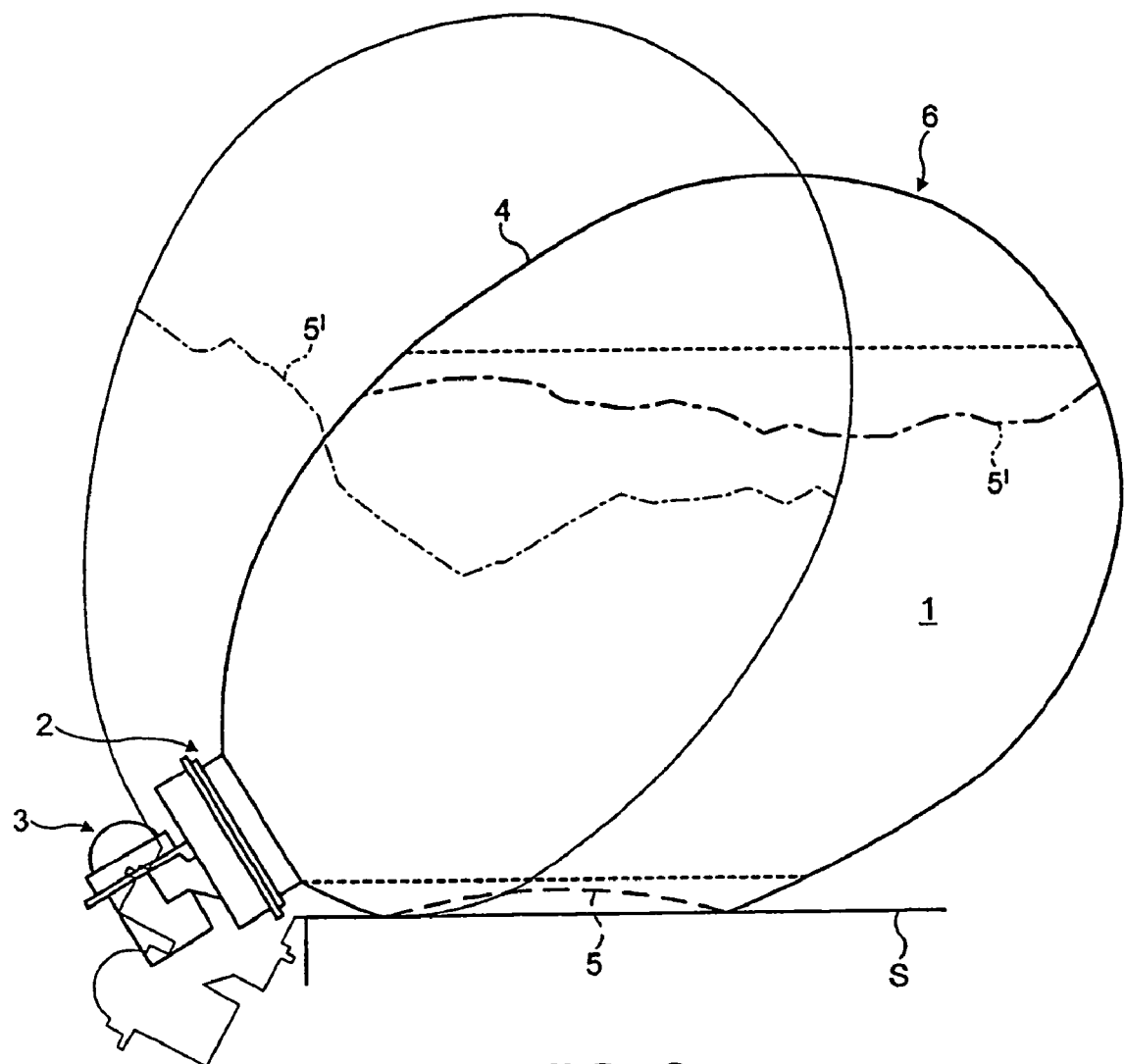
FIG. 2 is a schematic view in side elevation and in section of the container of FIG. 1 in the position of use.

In the embodiment described and depicted, the container for a flowable product, particularly for a beverage and, in particular, for mineral water, essentially consists of a body 1 and of at least one neck 2 which can be closed by a means 3 of closing off and/or of distributing the flowable product contained in the container, wherein the wall or walls 4 forming the body 1 of the container are made of a flexible plastic which can deform for constant surface area, particularly under the weight of the flowable product contained in the container when the wall or walls 4 encounter a point or bearing surface, so as to form, at least locally at this contact, at least one non-planar wall portion 5 (which are visible in FIGS. 1 and 2). In the embodiment of the figures, the container has a volume of 33 cl and the ratio $d_2$ on $d_1$ is of 1:8 (10 mm: 80 mm).

The means of closing is either a cap or sealed membrane. The caps can be used for any diameter of opening of the neck. On the contrary, the sealed membranes are preferred with smaller diameter of the neck, for example in the area of 10 mm. In this case, the container can support high compressions, for example by the storage and by the transportation. For diameters of around 10 mm, the container can support a pressure of the order of 5 bar. It is also possible to close the container by sealing or welding the neck, wherein a cutting object or similar is provided for the opening.

Indeed, the material of which the wall or walls 4 is or are made is thin and flexible enough for these walls to be able to deform locally, changing convexity (or concavity) as depicted in the FIGS. 1 and 2, but also rigid enough for the container to be able, under certain conditions, to maintain its initial shape obtained at the time of its manufacture. The empty container does not, for example, collapse on itself when empty as a flexible PVC bag used in packagings of the "bag-in-box" type particularly for distributing wine or in bags used in the hospital environment particularly for taking, transporting and storing blood or physiological liquids would do.

In addition, all the deformations which occur on or in the envelope formed by the wall or walls 4 occur at constant surface area (of the envelope), that is to say without the latter stretching or contracting as for example a container made of an extensile material of the elastomer type (inflatable balloon) would do.

Furthermore, the container according to the invention does not, with the possible exception of its bottom 6, have a wall portion or region 4 which is predeformed into a planar support portion, when it leaves the manufacturing shop. Indeed, the deformation or deformations of the wall 4 which allow the container to sit in a stable position do not normally occur until the container comes into contact with an object, for example with a support S on which it is stood (deformation in the bottom 6—FIG. 1) or laid down (deformation of the wall 4 that forms the flank of the container into a non-planar portion 5—FIG. 2).

The non-planar wall portion or portions 5 resulting from these temporary deformations therefore allow the container to remain stable on the support S on which it is stood or laid down.

When the contact between the container (completely full or completely empty) and the object or the support S is broken, the aforementioned deformations disappear in general and the container, if necessary with external assistance, reverts to its initial shape as obtained at the time of its manufacture by the stretch-blow molding of a preform.

The container according to the invention, empty or full, can thus be stored in a stable way, that is to say maintaining its original shape of manufacture, in a vertical position (neck 2 uppermost) by making it, for example, rest on a predefined (container empty) flat bottom 6 or on the convex bottom 6 originally given at the time of manufacture, which deforms locally at constant surface area under the weight of the contents into a non-planar (concave) portion 5 so as to form a base which is stable enough for the full container.

In an alternative, the bottom 6 may therefore be provided, at the time of its manufacture, with a flat region (planar or roughly planar part) that is preshaped.

In a particularly advantageous manner, the container according to the invention has a circular or substantially circular cross section.

This is because this geometry with symmetry of revolution is particularly easy and therefore economical to manufacture and has the advantage of allowing the container to be filled with products which can emit gaseous substances, such as carbonated beverages (sparkling waters, sodas, etc.) in particular, which are widely consumed worldwide these days. Such a shape is therefore particularly well suited to these liquids in that the release of carbon dioxide or other gas has a tendency to deform the bodies of bottles which do not have symmetry of revolution, having a negative impact on their stability, grasp and ease of handling, appearance, etc.

As a preference, the container has an ovoid or substantially ovoid overall shape. This natural shape derived from an egg illustrated in FIGS. 1 and 2 represents a structure whose resistance to vertical loads is optimized, thus making it possible, for a given volume and a given amount of material, to achieve mechanical properties which are equivalent to or even better than the cylindrical or roughly cylindrical shapes customarily encountered in this domain.

Figure 3:
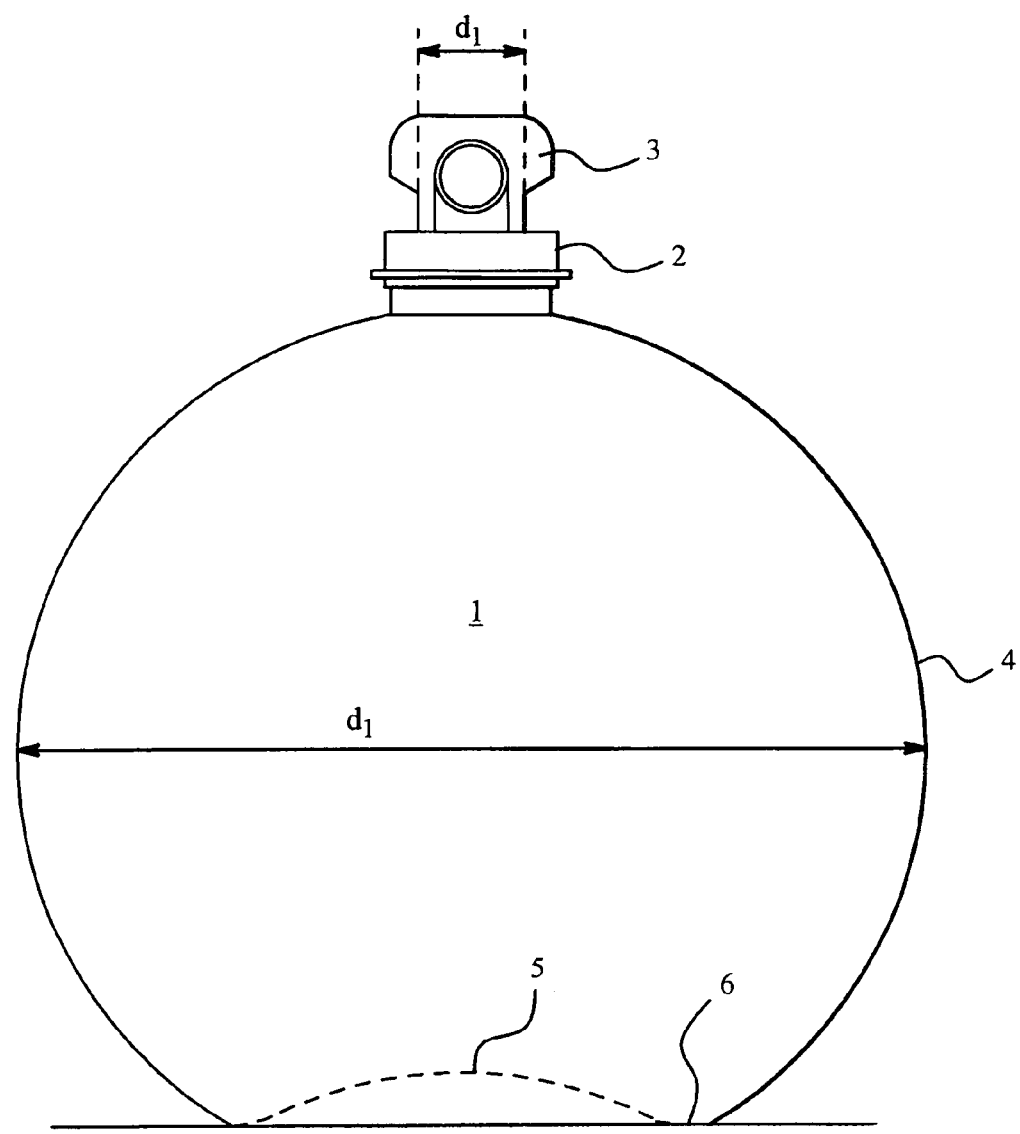
FIG. 3 is a schematic view in side elevation and in section of another embodiment of the container according to the invention.

In another embodiment illustrated in FIG. 3, the container according to the invention has a spherical shape or substantially spherical overall shape.

These simple shapes also allow the container according to the invention to be used as a refill for water coolers, for which a flat bottom 6 is not necessary, these refills generally being used by inserting the container, head (neck 2) downmost, into the accommodating device of the water cooler.

In addition, this type of surface geometry also makes it possible to increase the area for heat exchange between the container and the chilling device usually present in the water coolers.

As previously mentioned and as illustrated in FIGS. 1 and 2, the convexity of the container of the invention is, when the wall or walls 4 encounter a point or a bearing surface, at least locally inverted and vice versa.

Thus, in the case of the ovoid overall shape of the container depicted in the FIGS. 1 and 2, the convex external wall 4 of this container which comes into contact with the support S on which the container rests (for example the flat top of a table or the rungs of a shelf or support rack inside a refrigerator) deforms at constant surface area at least locally so that a concave surface or layer is created, whose points or surfaces of contact with the support S are limited.

Provision may be made for only the side walls 4 of the container to be made in such a way as to have this property, the wall 4 of the bottom 6 and/or near the neck 2 being, for example, made thicker so that these walls do not deform or deform very little.

In the position of use, the container according to the invention may, for example, be laid down on its side as depicted in FIG. 2.

The local deformation at constant surface area of the wall 4 which is in contact with the support S at the non-planar portion 5 is completely reversible and occurs automatically, as long as the container is still full enough, when the deforming contact ceases.

Unlike other materials, particularly certain elastic materials which hug the shape of the objects with which they are in contact, the convex wall 4 in contact with the support S deforms at constant surface area, at least locally, so as to (reversibly) change curvature to a concave curvature without ever passing through an intermediate planar state. In the technical field involved, this particular property is sometimes termed "bistable" to express the direct switch, without a transition through an intermediate planar state, from a convex state to a concave state and vice versa.

According to another feature, the plastic used to form the wall or walls 4 is a semicrystalline plastic with a slow rate of crystallization, the glass transition temperature ($T_g$) of which is 70° C. or higher and the crystallization temperature Tc is around 140° C.

A slow rate of crystallization is to be understood as meaning a rate which makes it possible to have an amorphous state by quick cooling.

Advantageously, the plastic used to form the wall or walls 4 is chosen from PET (polyethylene terephthalate) and PEN (polyethylene naphthalate). It has been noted that the drawing of the PET has no negative influence on the water barrier properties of the obtained container and that also a thickness of around 50 microns and less guarantees a good safety of the container itself and of the storage.

In order to guarantee both the flexibility needed for the aforementioned deformation and sufficient mechanical strength, the container according to the invention is further characterized in that the thickness of the wall or walls 4 forming the body 1 of the container is between 30 µm and 100 µm, preferably between 50 µm and 70 µm.

As already mentioned, small thicker areas or portions of walls 4 may also be provided on the body 1 of the container, particularly in close proximity to the neck 2 and/or the bottom 6, so as to reinforce these parts locally. Such reinforcements may in particular be useful to facilitate the filling of the containers or to increase their stability during storage.

As a preference, the container is further characterized in that the body 1 and the neck 2 of the container are made as a single piece. This makes it possible to avoid any joint or weld which may constitute a region of greater weakness.

The container according to the invention is particularly useful for containing beverages in quantities greater than those contained in the formats, for example bottles, currently encountered and whose capacity does not often exceed 2 liters.

Indeed, according to another feature, the container according to the invention is characterized in that, for a working volume of 5 liters, the amount of PET used to produce the container is about 30 g for resistance to a vertical load of about 65 kg. This represents a significant saving in plastic, the few 5-liter containers that are currently on the market requiring an amount of polymer which, for comparable mechanical strength, is over three times greater than the amount needed to manufacture a container according to the present invention. When containers of lower volumes are used, for example of the order of 33 cl, the quantity of plastic material is of the order of 3–4 g, in comparison with a bottle of the same volume, wherein the amount of plastic is of the order of 12 g.

According to another embodiment, the container according to the invention is characterized in that the body 1 has a bottom 6 exhibiting a planar or roughly planar part. This part may be produced using all the methods habitually encountered in the field of the manufacture of synthetic containers (flat bottom with or without reinforcing ribs, petaloid bottom, etc.).

However, provision may be made for the bottom 6 of the container according to the invention to consist only of the wall 4 in its original shape as directly obtained after the stretch-blow molding of the corresponding preform, that is to say without additional special structure, shape or overmolding. In the case of an ovoid shape, for example, the bottom 6 will be that of this concave shape.

The curvature of the bottom 6 may possibly be slightly flattened in this region so that the container can be stored vertically more easily without falling sideways.

For greater stability, the wall thickness may be increased slightly at the bottom 6 (thickness of the order of 100 to 150 µm).

In another alternative form, the containers according to the invention may also be equipped with rigid bases (known per se) intended to accommodate a non-planar bottom 6.

According to another alternative form, the container according to the invention is characterized in that the neck 2 is fitted with a closure and/or distribution means 3 produced in the form of a distribution tap which can be operated with one hand.

Such distribution taps, which are known per se, advantageously allow the distribution of the flowable product contained in the container to be regulated in a particularly convenient way, for example when this container is stored horizontally on the shelves of a refrigerator, the other hand holding the container into which the flowable product is to be transferred, for example, with a view to consuming it.

When using the container according to the invention for distributing the product contained therein, external atmospheric pressure is exerted on the upper part of the wall 4 which deforms, like a deflating balloon, as the container is emptied of its contents. This takes place without air entering the container. The shape of the container emptying without the intake of air is depicted in FIG. 2, in which the deformed walls 4 have been depicted, on the one hand, in unbroken line in the case of the non-planar wall portions 5 in contact with the support S and, on the other hand, in chain line in the case of the non-planar wall portions 5' present on the remainder of the body 1 of the container.

When the container is emptied of its contents without allowing air in to replace the removed volume of liquid, the non-planar portions 5 acting as a support may, in conjunction with the deformations of walls 4 (not in contact with an object such as the support S) to non-planar portions 5', play a part in reducing the volume occupied by the container during this distribution (without air intake) of the flowable product contained in the container. This will, for example, have the result that the aforementioned deformations to non-planar wall portions 5 will be accentuated as this distribution progresses to a certain point, thereby improving the stability of the container on, for example, the support S.

Storage and distribution in which the flowable product contained in the container according to the invention is not in contact with the air is particularly advantageous for use in the water coolers already mentioned because this limits the risk of bacteriological contamination.

Of course, positioning the neck 2 low down, having a pump system, etc., may further encourage the product to flow. Likewise, an external air intake is also possible. In such a case, it will then be necessary to make sure that the neck 2 is positioned lower down than the level of the liquid, as atmospheric pressure may no longer be sufficient to expel the liquid. This situation is suggested by FIG. 2. When the volume of the flowable product which has flowed out has been entirely compensated for with air, the initial ovoid shape of the container is maintained (wall 4 in solid line). It is then possible that the level of remaining flowable product (indicated in dotted line) is lower down than the outlet of the closure and/or distribution means 3. In this case, the container simply has to be inclined slightly in order to overcome this situation.

In order to avoid this type of handling operation, care will therefore be taken to employ a closure and/or distribution means 3 which minimizes the amount of air entering the container. Thus, and by virtue of the construction of the wall or walls 4 forming the container, the latter will deform as explained above as its contents are gradually removed, on top of this freeing up the space previously occupied, for example in the refrigerator in which it was stored (cf. lines in chain line in FIG. 2).

In the case of use in a water cooler, the container according to the invention will be placed vertically and upside down (neck 2 downmost) in the receptacle provided for that purpose in the cooler, the envelope forming the body 1 of the container collapsing down onto itself in time as the flowable product is removed without allowing the entry of air.

Because of its flexible nature, the geometry of the container can also adapt more readily to that of the storage place, as opposed to the rigid cans currently available which need to observe very specified dimensions in order to be able to be stored in restricted spaces such as the internal compartments of refrigerators. In addition, the space freed as a container according to the invention is emptied can also be put to use for storing objects the size or shape of which can vary, which is not the case with rigid containers in which the volume of liquid removed is systematically replaced with air. In this type of container, the volume initially occupied remains so until the empty container is removed from the refrigerator.

Another subject of the present invention is the use of the container by way of large-capacity, at least 5-liter capacity, container intended to contain water or a still liquid beverage, particularly still mineral water.

Another subject of the present invention is the use of the container according to the invention by way of large-capacity, at least 5-liter capacity, container intended to contain carbonated water or a carbonated liquid beverage, particularly sparkling mineral water.

Of course, the containers of the present invention are not in any way limited to flat or sparkling mineral waters but can be intended to contain all sorts of flowable products, edible or inedible liquids of greater or lesser fluidity such as, for example, fruit juices, milk-based beverages, etc., and also sauces or condiments (ketchup, mustard, dressing, etc.) or non-food liquids (deionized water, cleaning products, detergents, etc.).

Finally, another subject of the present invention is a method for manufacturing a body 1 of a container according to the invention, characterized in that the body 1 is obtained by stretch-blow molding of a PET preform suited to the manufacture of the body 1 with an area stretch ratio of between 20 and 50, preferably between 25 and 35. Compared with the blowing of plastic bottles, wherein the blowing pressure is comprised between 30 and 40 bar, according to the process of the invention, it is sufficient to blow at a pressure of around 3 or 4 times less, i.e., between about 8 and 13 bar. This reduces the cost of the process and also of the machine which is used.

A suitable preform may, for example, be produced in the form of an open transparent PET cylinder with an outside diameter of about 3 cm, an inside diameter of about 2.5 cm, about 1 cm tall and ending at one end in a substantially conical part about 1 cm tall, the top and the base of the conical part preferably being rounded. In a conventional way, the preform also has one or more external peripheral annuluses intended to form part of the neck 2 or throat.

In the embodiments of the containers according to the invention, for volumes of 33 cl, 1 liter, 5 l, 10 l and 20 l, the different ratios $d_2$ on $d_1$ are comprised between 1:4.5 and 1:7.7

Of course, the invention is not restricted to the embodiments described and depicted in the appended drawings. Modifications remain possible, particularly from the point of view of the construction of the various elements or by substituting technical equivalents, without thereby departing from the field of protection of the invention.

What is claimed is:

1. A container comprising:
    a body having in greater section a dimension $d_1$, wherein the body includes a bottom that exhibits a planar or roughly planar part;
    at least one neck that has an internal diameter $d_2$; and
    a wall or walls forming the body of the container, the body being made as a single piece and of a flexible plastic which can deform for constant surface area, particularly under the weight of the flowable product contained in the container, when the wall or walls contact a point or bearing surface so as to form, at least locally at this contact, at least one non-planar wall portion, wherein the ratio $d_2$ to $d_1$ is between 1:3 and 1:10.

2. The container of claim 1, wherein the ratio $d_2$ to $d_1$ is between 1:4 and 1:10.

3. The container of claim 1, which has a circular or substantially circular cross section.

4. The container of claim 3, which has an ovoid or substantially ovoid overall shape.

5. The container of claim 3, which has a spherical or substantially spherical overall shape.

6. The container of claim 1, wherein when the wall or walls contact the point or bearing surface, a convexity of the container is at least locally inverted and vice versa.

7. The container of claim 1, wherein the plastic used to form the wall or walls is a semi-crystalline plastic having a slow rate of crystallization, a glass transition temperature ($T_g$) of 70° C. or higher and a crystallization temperature $T_c$ of 140° C.

8. The container of claim 1, wherein the plastic used to form the wall or walls is PET (polyethylene terephthalate) or PEN (polyethylene naphthalate).

9. The container of claim 1, wherein the wall or walls forming the body of the container has a thickness of between 30 μm and 100 μm.

10. The container of claim 9, wherein the wall thickness is between 50 µm and 70 µm.

11. The container of claim 1, wherein the body and the neck of the container are made as a single piece.

12. The container of claim 1, wherein, for a working volume of 5 liters, the amount of flexible plastic used to produce the container is about 30 g for resistance to a vertical load of about 65 kg.

13. The container of claim 1, wherein the neck is fitted with a closure.

14. The container of claim 13, wherein the closure comprises a distribution tap which can be operated with one hand.

15. A combination of the container of claim 1 having a variable capacity and a flowable product of water or a liquid beverage.

16. The combination of claim 15 wherein the flowable product is carbonated water or a carbonated beverage.

17. A container comprising:

a body having in greater section a dimension $d_1$;

at least one neck that has an internal diameter $d_2$; and a wall or walls forming the body of the container, the body being made as a single piece and of a flexible plastic which can deform for constant surface area, particularly under the weight of the flowable product contained in the container, when the wall or walls contact a point or bearing surface so as to form, at least locally at this contact, at least one non-planar wall portion, wherein the ratio $d_2$ to $d_1$ is between 1:3 and 1:10, and wherein, for a working volume of 5 liters, the amount of flexible plastic used to produce the container is about 30 g for resistance to a vertical load of about 65 kg.

* * * * *